US011278806B2

(12) United States Patent
Lee

(10) Patent No.: US 11,278,806 B2
(45) Date of Patent: Mar. 22, 2022

(54) METHOD AND SYSTEM FOR PROMOTING PLAYER CHARACTER IN SPORTS GAME USING DUALIZED SPACE

(71) Applicant: GAMEVIL INC., Seoul (KR)

(72) Inventor: Dong Won Lee, Seoul (KR)

(73) Assignee: GAMEVIL INC., Seoul (KR)

( * ) Notice: Subject to any disclaimer, the term of this patent is extended or adjusted under 35 U.S.C. 154(b) by 155 days.

(21) Appl. No.: 16/877,252

(22) Filed: May 18, 2020

(65) Prior Publication Data
US 2020/0376379 A1  Dec. 3, 2020

(30) Foreign Application Priority Data
Jun. 3, 2019  (KR) .................. 10-2019-0065189

(51) Int. Cl.
*A63F 13/533* (2014.01)
*A63F 13/828* (2014.01)
*G06F 3/0482* (2013.01)

(52) U.S. Cl.
CPC .......... *A63F 13/533* (2014.09); *A63F 13/828* (2014.09); *G06F 3/0482* (2013.01); *A63F 2300/308* (2013.01); *A63F 2300/8052* (2013.01)

(58) Field of Classification Search
CPC ............ A63F 2300/8052; A63F 13/533; A63F 13/828; A63F 2300/308
See application file for complete search history.

(56) References Cited

U.S. PATENT DOCUMENTS

| 5,885,156 A * | 3/1999 | Toyohara ................ A63F 13/58 463/1 |
| 6,347,993 B1* | 2/2002 | Kondo ..................... A63F 13/10 463/1 |
| 2021/0060423 A1* | 3/2021 | Kitahara ............ A63B 23/1254 |

FOREIGN PATENT DOCUMENTS

| JP | 2014097129 A | 5/2014 |
| JP | 6327726 B1 | 5/2018 |
| JP | 2019042595 A | 3/2019 |

(Continued)

OTHER PUBLICATIONS

"[PowerPro 2018] Fielder training theory Explains recommended high schools, girlfriends, items, and special abilities", May 21, 2018, https://gameranbu.jp/pawapuro2018/1f0634acb34bcaa8e844, 13 pages.

(Continued)

*Primary Examiner* — Steve Rowland
(74) *Attorney, Agent, or Firm* — Christensen O'Connor Johnson Kindness PLLC

(57) ABSTRACT

Disclosed are a method and system for promoting a player character in a sports game using a dualized space. A player character promotion method may include processing a progress of a sports game instance in which at least one player character controlled in response to a user's input participates through a first virtual space configured for the progress of a sports game, providing a user interface for promoting a promotion mode for a given player character between sports game instances, and performing a promotion scenario for a selected player character through a second virtual space different from the first virtual space for the progress of the sports game instance when the promotion mode for the selected player character is activated through the user interface.

16 Claims, 9 Drawing Sheets

(56) References Cited

FOREIGN PATENT DOCUMENTS

| KR | 10-2013-0082956 | 7/2013 |
| KR | 10-2016-0149981 A | 12/2016 |

OTHER PUBLICATIONS

Office Action dated Oct. 20, 2020, in corresponding Korean application No. 10-2019-0065189 (Korean version), filed Jun. 3, 2019, 7 pages.
Office Action dated Jul. 13, 2021, in corresponding Japanese application No. 2020-082246 (Japanese version), 3 pages.

* cited by examiner

METHOD AND SYSTEM FOR PROMOTING PLAYER CHARACTER IN SPORTS GAME USING DUALIZED SPACE

CROSS REFERENCE TO RELATED APPLICATION

This application is based on and claims priority under 35 U.S.C. 119 to Korean Patent Application No. 10-2019-0065189, filed on Jun. 3, 2019, in the Korean Intellectual Property Office, the disclosures of which is herein incorporated by reference in their entireties.

BACKGROUND OF THE INVENTION

Field of the Invention

The following description relates to a method and system for promoting a player character in a sports game using a dualized space.

Related Art

A sports game is a game based on sports, such as baseball, soccer, or basketball, and is divided into an action game genre and a simulation game genre. However, the sports game itself tends to be classified as a separate genre. In such a sports game, there are characters that perform a corresponding sports event. In most of sports games, at least one status related to the progress of a game is set in each of characters. The status of the character may be a fixed value, but may be changed depending on the game. Particularly, in some games, users can promote their player characters in order to improve the statuses of the player characters. For example, Korean Patent Application Laid-Open No. 10-2013-0082956 relates to a system and method for managing tactics in an online sport simulation game and a recording medium thereof", and discloses that a player character belonging to his or her team can be promoted.

SUMMARY OF THE INVENTION

Provided are a player character promotion method capable of promoting a player character through a second virtual space in which a promotion scenario is performed separately from a first virtual space related to the progress of a sports game in the sports game, a computer apparatus for performing the player character promotion method, and a computer program combined with the computer apparatus and stored in a computer-readable recording medium in order to execute the player character promotion method in the computer apparatus and a recording medium therefor.

Provided are a player character promotion method capable of promoting a player character in a second virtual space according to a promotion scenario determined or combined based on a selected team, a selected player character and/or a selected trainer character, among multiple promotion scenarios configured for each team, each player character and/or each trainer character, a computer apparatus for performing the player character promotion method, and a computer program combined with the computer apparatus and stored in a computer-readable recording medium in order to execute the player character promotion method in the computer apparatus and a recording medium therefor.

In an embodiment, a player character promotion method performed by a computer apparatus including at least one processor includes processing, by the at least one processor, the progress of a sports game instance in which at least one player character controlled in response to a user's input participates through a first virtual space configured for the progress of a sports game, providing, by the at least one processor, a user interface for promoting a promotion mode for a given player character between sports game instances, and performing, by the at least one processor, a promotion scenario for a selected player character through a second virtual space different from the first virtual space for the progress of the sports game instance when the promotion mode for the selected player character is activated through the user interface.

According to one aspect, a promotion scenario may be configured in each of a plurality of teams included in the sports game. Performing the promotion scenario may include performing a promotion scenario pre-configured for a team to which a player character selected through the user interface belongs.

According to another aspect, the promotion scenario may be performed using a turn method. Performing the promotion scenario may include selecting a single event associated with a given trainer character in a combination list in which a first event list comprising at least one single event selected based on a team to which a player character selected through the user interface belongs and a second event list comprising at least one single event selected based on at least one trainer character further selected through the user interface have been combined, and performing the selected single event between turns of the promotion scenario. A likeability value between the given trainer character and the player character may be adjusted according to the progress of the single event.

According to yet another aspect, performing the promotion scenario may include determining whether a combo event associated with given two or more trainer characters included in a third event list comprising combo events selected based on a combination of two or more trainer characters is generated at timing at which the progressed single event is terminated when the two or more trainer characters are selected through the user interface, selecting a given combo event in the third event list in response to the determination of the combo event generated, and performing the selected combo event. A likeability value between each of the given two or more trainer characters and the player character may be adjusted according to the progress of the combo event.

According to yet another aspect, performing the promotion scenario may include performing training of the player character in which a trainer character selected among at least one trainer character further selected through the user interface participates. The status of the player character may be adjusted based on a result of the progress of the training into which a training effect according to the selected trainer character has been incorporated.

According to yet another aspect, the trainer character scheduled to participate in the training of the player character may be selected based on a probability for each status item that belongs to probabilities for respective status items configured in each of the further selected at least one trainer character and that corresponds to a status item by which the player character is to be trained through the training.

According to yet another aspect, the trainer character scheduled to participate in the training of the player character may be selected further based on a likeability value set between the player character and each of the further selected at least one trainer character.

According to yet another aspect, as the training proceeds, a likeability value between the selected trainer character and the player character may be further adjusted.

According to yet another aspect, performing the promotion scenario may include establishing a connection relationship between a given trainer character and the player character based on a likeability value set between the player character and each of at least one trainer character further selected through the user interface. A boosting effect for increasing a training effect may be applied to the training of the player character based on the established connection relationship.

According to yet another aspect, a likeability value between the player character and at least one trainer character further selected through the user interface may be adjusted based on at least one of training and an event generated according to the progress of the promotion scenario. A connection relationship may be established between the player character and a given trainer character based on the likeability value. A boosting effect for increasing a training effect may be applied to the training of the player character based on the established connection relationship.

In an embodiment, there is provided a non-transitory processor-readable medium having instructions stored thereon, which when executed by one or more processors, cause the one or more processors to implement the method.

In an embodiment, there is provided a computer apparatus including at least one processor implemented to execute instructions readable in a computer, wherein the at least one processor processes the progress of a sports game instance in which at least one player character controlled in response to a user's input participates through a first virtual space configured for the progress of a sports game, provides a user interface for promoting a promotion mode for a given player character between sports game instances, and performs a promotion scenario for a selected player character through a second virtual space different from the first virtual space for the progress of the sports game instance when the promotion mode for the selected player character is activated through the user interface.

DESCRIPTION OF EXEMPLARY EMBODIMENTS

Hereinafter, embodiments are described in detail with reference to the accompanying drawings.

A player character promotion method according to various embodiments of the present invention may be implemented by at least one computer apparatus. A computer program according to an embodiment of the disclosure may be installed and driven in the computer apparatus. The computer apparatus may perform the player character promotion method according to an embodiment of the disclosure under the control of a driven computer program. The computer program may be stored in a computer-readable recording medium coupled to the computer apparatus in order to execute the player character promotion method in the computer apparatus.

Figure 1:
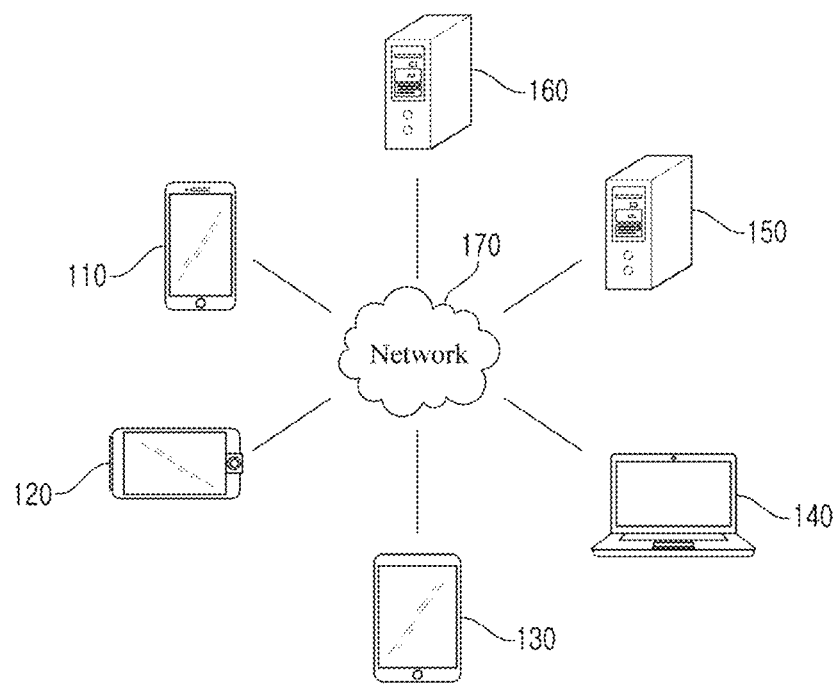
FIG. 1 is a diagram illustrating an example of a network environment according to an embodiment of the present invention.

FIG. 1 is a diagram illustrating an example of a network environment according to an embodiment of the present invention. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer apparatuses. For example, the plurality of electronic devices 110, 120, 130 and 140 may include a smartphone, a mobile phone, a navigator, a computer, a laptop, a terminal for digital broadcasting, a personal digital assistants (PDA), a portable multimedia player (PMP), and a tablet PC. For example, in FIG. 1, an example of a shape of the electronic device 1 (110) is illustrated as being a smartphone. However, in embodiments of the present invention, the electronic device 1 (110) may mean one of various physical computer apparatuses capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer apparatus or a plurality of computer apparatuses, which provides a command, code, a file, content, or a service through communication with the plurality of electronic devices 110, 120, 130 and 140 over the network 170. For example, the server 150 may be a system that provides a service (e.g., a game service, a messaging service, a mail service, a social network service, a map service, a translation service, a financial service, a settlement service, a search service, or a content provision service) to the plurality of electronic devices 110, 120, 130 and 140 connected thereto over the network 170.

Figure 2:
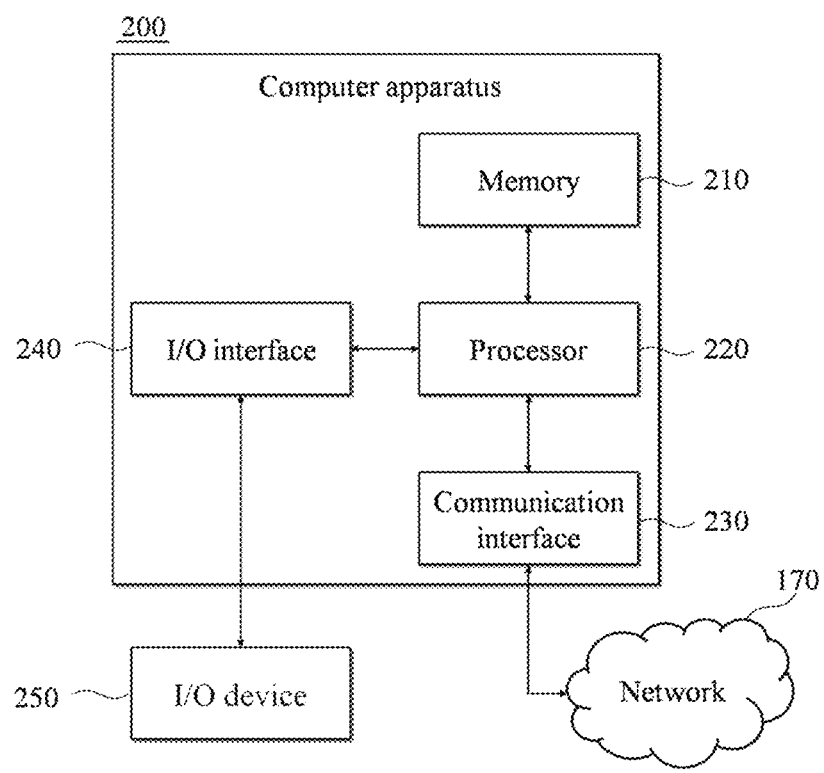
FIG. 2 is a block diagram illustrating an example of a computer apparatus according to an embodiment of the present invention.

FIG. 2 is a block diagram illustrating an example of a computer apparatus according to an embodiment of the present invention. Each of the plurality of electronic devices 110, 120, 130 and 140 or each of the servers 150 and 160 may be implemented by a computer apparatus 200 illustrated in FIG. 2.

As illustrated in FIG. 2, the computer apparatus 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer apparatus 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer apparatus 200 based on a computer program installed by files received over the network 170.

The processor 220 may be configured to process instructions of a computer program by performing default arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer apparatus 200 to communicate with other devices (e.g., the aforementioned storage devices) over the network 170. For example, a request, a command, data or a file generated by the processor 220 of the computer apparatus 200 based on program code stored in a recording device, such as the memory 210, may be provided to other devices over the network 170 under the control of the communication interface 230. Inversely, a signal, a command, data or a file from another device may be received by the computer apparatus 200 through the communication interface 230 of the computer apparatus 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer apparatus 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer apparatus 200.

Furthermore, in other embodiments, the computer apparatus 200 may include elements greater or smaller than the elements of FIG. 2. However, it is not necessary to clearly illustrate most of conventional elements. For example, the computer apparatus 200 may be implemented to include at least some of the I/O device 250 or may further include other elements, such as a transceiver and a database.

Figure 3:
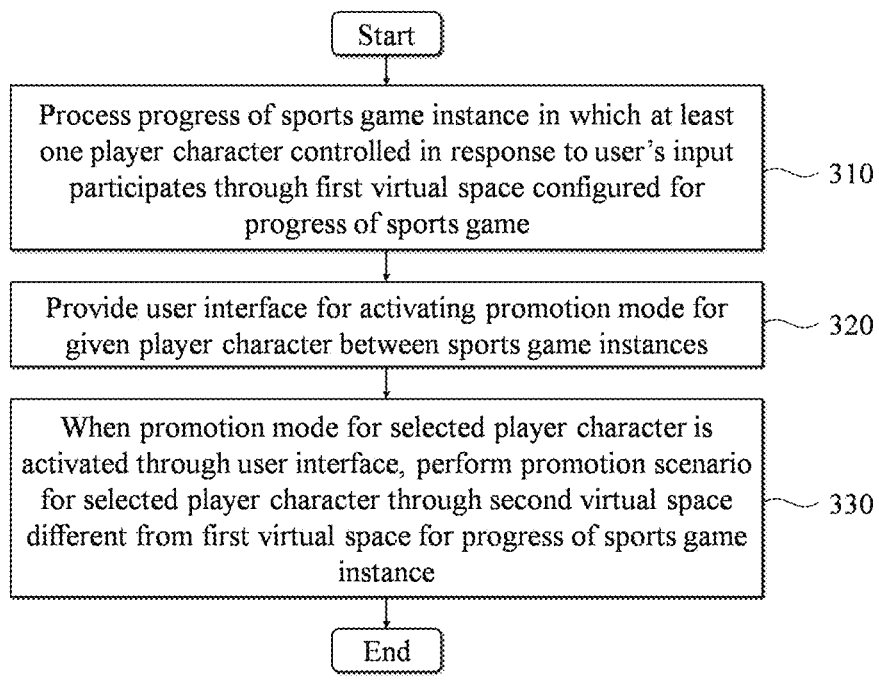
FIG. 3 is a flowchart illustrating an example of a player character promotion method according to an embodiment of the present invention.

FIG. 3 is a flowchart illustrating an example of a player character promotion method according to an embodiment of the present invention. The player character promotion method according to the present embodiment may be performed by the computer apparatus 200. For example, the processor 220 of the computer apparatus 200 may be implemented to execute a control instruction according to a code of an operating system or a code of at least one computer program included in the memory 210. In this case, the processor 220 may control the computer apparatus 200 to perform steps 310 to 330 included in the method of FIG. 3 in response to a control instruction provided by a code stored in the computer apparatus 200.

At step 310, the computer apparatus 200 may process the progress of a sports game instance in which at least one player character controlled in response to a user's input participates through a first virtual space configured for the progress of a sports game. For example, in the case of a baseball game, a sports game instance for the baseball game may be performed between two of a plurality of teams present in the baseball game. In one embodiment, the computer apparatus 200 may perform the sports game instance under the control of a computer program, such as an application for the sports game. In another embodiment, the sports game instance may be performed through a server (e.g., the server 150 described with reference to FIG. 1) that provides services for a corresponding sports game. In this case, the computer apparatus 200 may process the progress of the sports game instance while communicating with the corresponding server over the network 170 under the control of the computer program. In this case, the first virtual space may mean a virtual space in which a virtual game according to the sports game is performed. Furthermore, the player character may mean a character assigned to a user for the progress of the sports game. For example, in a baseball game, baseball player characters belonging to the team of a user may be player characters.

At step 320, the computer apparatus 200 may provide a user interface for activating a promotion mode for a given player character between sports game instances. For example, functions for managing player characters for a sports game may be provided before a second sports game instance is started after a first sports game instance is ended. As a more detailed example, in a baseball game, functions for replacing players who will participate in a second sports game instance, such as that a starting pitcher or closing pitcher for the second sports game instance is selected, may be provided. In this case, a user interface for activating a promotion mode for a player character may be provided to a user along with such functions. For example, when the user selects a player character to be promoted in a list of player characters through the user interface and presses a promotion start button, a promotion mode for the selected player character may be activated. Such a promotion mode may be basically used to improve a status set for the selected player character.

At step 330, when the promotion mode for the selected player character is activated through the user interface, the computer apparatus 200 may perform a promotion scenario for the selected player character through a second virtual space different from the first virtual space for the progress of the sports game instance. In other words, a virtual space for the progress of the sports game instance and a virtual space in which the promotion scenario for the selected player character is performed may be dualized. Various types of promotion content may be provided through such a dualized second virtual space. For example, a three-dimensional (3-D) virtual space for the progress of promotion may be configured. More various types of content different from a sports game in the 3-D virtual space may be provided. In some embodiments, a trainer character may be incorporated into the promotion of a player character. Such a trainer character is described more specifically later. The progress of the promotion scenario may be also performed through a server that provides services for a corresponding sports game. In this case, the computer apparatus 200 may process the progress of the promotion scenario while communicating with a corresponding server over the network 170 under the control of a computer program.

Figure 4:
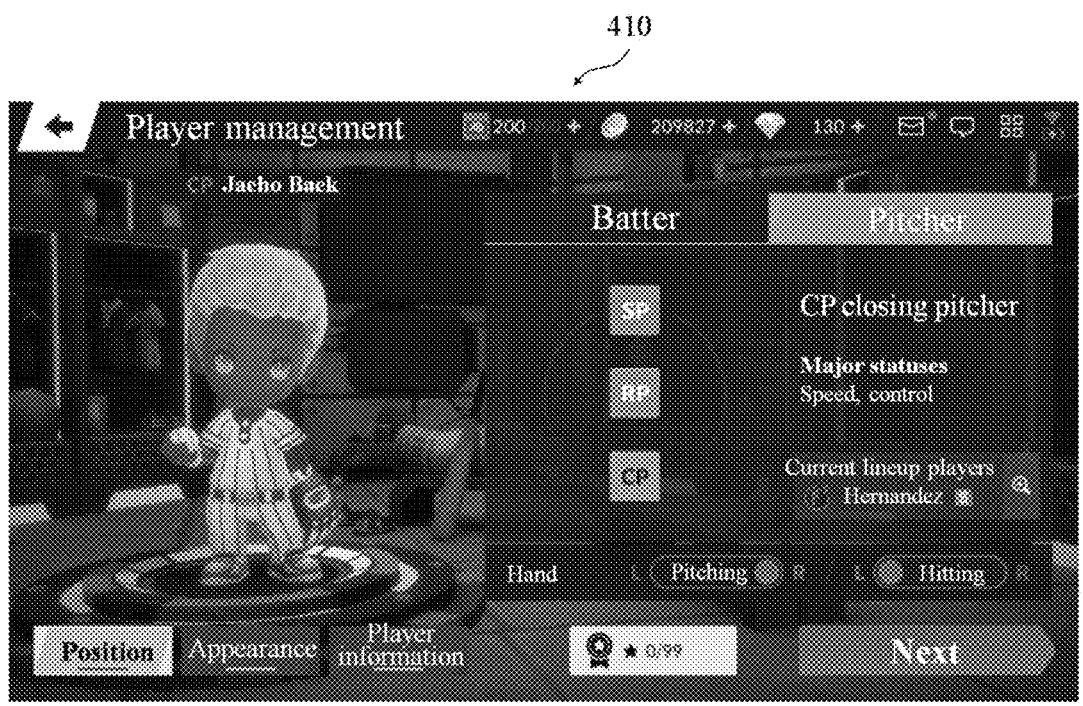
FIG. 4 is a diagram illustrating an example of an implementation of a screen in which a player character has been selected according to an exemplary embodiment of the present invention.

FIG. 4 is a diagram illustrating an example of an implementation of a screen in which a player character has been selected according to an exemplary embodiment of the present invention. In FIG. 4, a screen 410 illustrates a shape of a player character selected by a user for promotion. When a user selects a player character to be promoted, a promotion scenario pre-configured for a team to which the selected player character belongs may be automatically selected. The selected promotion scenario may be applied for the promotion of the selected player character.

Figure 5:
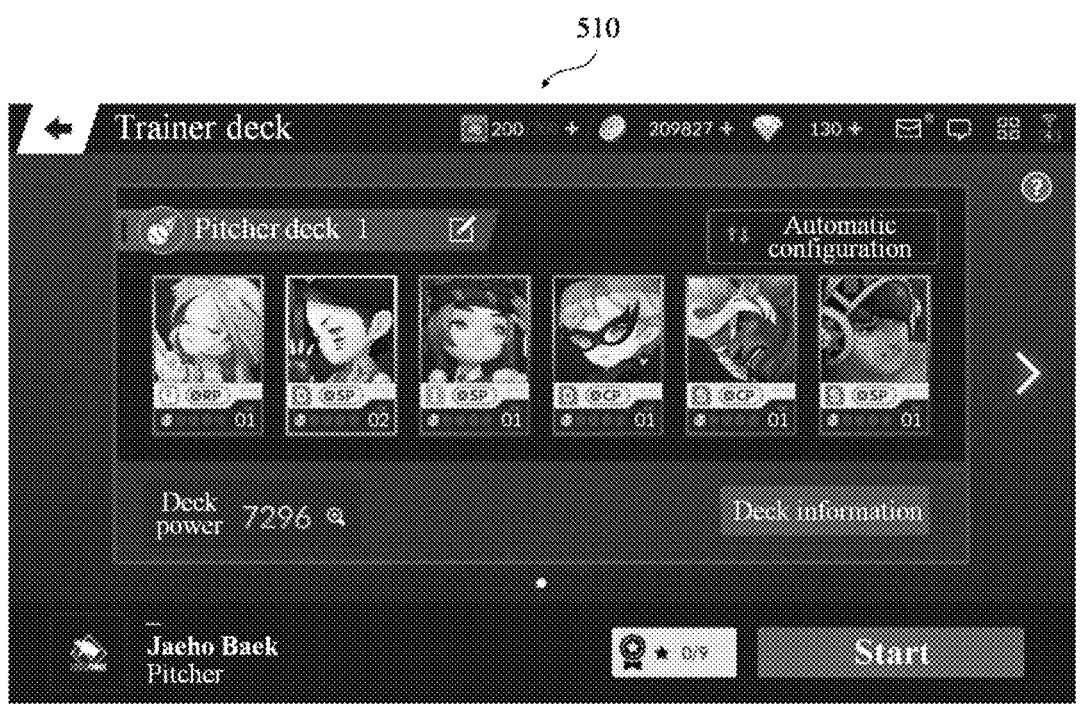
FIG. 5 is a diagram illustrating an example of a screen in which trainer characters have been selected according to an exemplary embodiment of the present invention.

FIG. 5 is a diagram illustrating an example of a screen in which trainer characters have been selected according to an exemplary embodiment of the present invention. In FIG. 5, a screen 510 illustrates shapes of multiple trainer characters selected by a user. The trainer characters are characters that affect the training results of player characters. A user may further select at least one of trainer characters assigned thereto at step 330. In some embodiments, the selection of trainer characters may be performed by a system not a user. For example, when a user selects a player character for the activation of a promotion mode, given trainer characters may be automatically selected by a server. In this case, the trainer characters may be randomly selected, but the server may select trainer characters which may be most helpful for the training of the selected player character.

Figure 6:
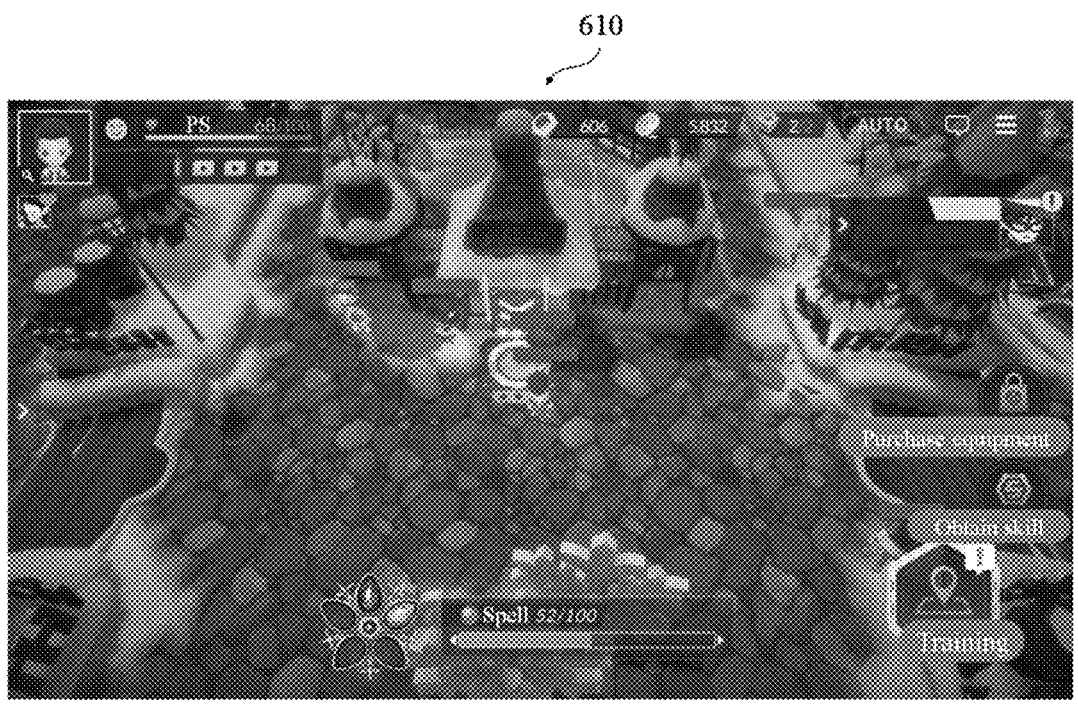
FIG. 6 is a diagram illustrating an example of an implementation of a second virtual space according to an exemplary embodiment of the present invention.

FIG. 6 is a diagram illustrating an example of an implementation of a second virtual space according to an exemplary embodiment of the present invention. In FIG. 6, a screen 610 illustrates an example in which in a baseball game, a separate virtual space for the promotion of a player character separately from a virtual space for the progress of baseball may be provided and users can be provided with various types of content different from the baseball game may be provided through such a dualized virtual space. A promotion scenario for the promotion of a selected player character may be performed in such a virtual space separately from a baseball game. For example, a promotion scenario may be pre-configured in each of a plurality of teams included in a sports game. For example, if services for a sports game are provided through a server, the server may pre-configure and store a promotion scenario for each team included in the sports game. The server may provide a client that has activated a promotion mode with a promotion scenario pre-configured for a team corresponding to the client. In this case, the computer apparatus 200 may perform a promotion scenario per-configured to a team to which the selected player character belongs through the user interface at step 330. In some embodiments, the player character selected by a user, as described with reference to FIG. 4, and the trainer characters selected by a user, as described with reference to FIG. 5, may be represented in such a second virtual space.

Figure 7:
FIG. 7 is a diagram illustrating an example of an implementation of a training system according to an exemplary embodiment of the present invention.

FIG. 7 is a diagram illustrating an example of an implementation of a training system according to an exemplary embodiment of the present invention. In the present embodiment, a promotion scenario may be performed based on pieces of training using a turn method. In this case, the training of any one of status items (e.g., muscular strength, intelligence, agility, will, and skill) of a player character may be performed for each turn. For example, in FIG. 7, a screen 710 illustrates an example of a user interface for starting training for improving the intelligence status of a player character. In this case, as described with reference to FIG. 5, a given trainer character of at least one trainer character selected through the user interface may be selected, and may participate in the training of the player character.

A training deployment probability for each trainer character may be independently calculated. For example, Table 1 illustrates an example of default probabilities for the status items of trainer characters in a given training scenario.

TABLE 1

| Item | Trainer 1 | Trainer 2 | Trainer 3 | Trainer 4 | Trainer 5 | Trainer 6 |
| --- | --- | --- | --- | --- | --- | --- |
| Muscular strength | 40/100 | 40/100 | 40/100 | 40/100 | 40/100 | 40/100 |
| Intelligence | 20/100 | 20/100 | 20/100 | 20/100 | 20/100 | 20/100 |
| Agility | 50/100 | 50/100 | 50/100 | 50/100 | 50/100 | 50/100 |
| Will | 30/100 | 30/100 | 30/100 | 30/100 | 30/100 | 30/100 |
| Club | 50/100 | 50/100 | 50/100 | 50/100 | 50/100 | 50/100 |
| Skill | 20/100 | 20/100 | 20/100 | 20/100 | 20/100 | 20/100 |

In this case, a trainer character that will participate in the training of a player character may be selected based on a probability for each status item that belongs to the probabilities for the status items configured in each of the trainer characters and that corresponds to a status item by which the player character will be trained through training. For example, in Table 1, the probability that the trainer 1 will be deployed in muscular strength training may be 40% (40/100) in a percentile probability. When a user performs muscular strength training for a player character, the probability that the trainer 1 will be deployed is 40%. Likewise, when the user performs intelligence training for the player character, the probability that the trainer 1 will be deployed is 20%. Accordingly, a trainer character may not be deployed for one piece of training, and two or more trainer characters may be deployed for one piece of training.

In some embodiments, the final deployment probability that trainer characters will be deployed in pieces of training may be determined further based on an additional probability and likeability value in addition to the default probabilities. In this case, the likeability value is a value indicative of likeability between a trainer character and a player character, and may be adjusted based on a training progress and/or event progress between a trainer character and a player character. Such a likeability value is described more specifically later. The additional probability may be the deployment probability of a trainer character, which may be increased through an item. For example, if a buff item whose muscular strength training deployment probability increases 5% during 3 turns is used, the deployment probability of muscular strength training of a trainer character in which the corresponding buff item is used may increase 5% as an additional probability during the 3 turns.

If a trainer character participates in the training of a player character, a training effect of the trainer character may be incorporated into training results. For example, an training effect for decreasing the exhaustion of physical strength necessary for the training of a player character or increasing a success rate may have been configured in a trainer character. Such a training effect may be incorporated into the training of a player character. All trainer characters may have been specialized for one status item. For example, if a trainer character specialized for the intelligence status item participates in intelligence training, an increment of the intelligence status may increase.

When a trainer character participates in the training of a player character, a likeability value between the trainer character and the player character is adjusted. For example, a likeability value between a trainer character and a player character may be increased. In this case, the final deployment probability of the player character for the trainer character is increased. In contrast, if a likeability value between a trainer character and a player character is set to be decreased, the final deployment probability of the player character for the trainer character that has participated in training once is decreased.

As described above, training may be performed on a specific status item for each turn of a promotion scenario. When all the turns are terminated, a process of training a corresponding player character may be terminated.

Figure 8:
FIG. 8 is a diagram illustrating an example of an implementation of an event system according to an exemplary embodiment of the present invention.

FIG. 8 is a diagram illustrating an example of an implementation of an event system according to an exemplary embodiment of the present invention. In FIG. 8, a screen 810 illustrates an example of an event which may be generated during a promotion scenario. The screen 810 illustrates the state in which multiple events are presented at once and a user selects one of the presented events and performs the selected event. Such an event may be generated between the turns of a promotion scenario, and may be divided into a single event and a combo event depending on the subject of generation/condition. The single event may include an event generated by a specific trainer character or promotion scenario. The combo event may mean an event generated by a combination of two or more trainer characters. When each turn of a promotion scenario is terminated, a single event may be generated based on a given probability. When a single event is terminated, a combo event may be generated based on a given probability.

For example, at step 330, the computer apparatus 200 may select a given single event in a combination list in which a first event list, including at least one single event selected based on a team to which a player character selected through the user interface belongs, and a second event list, including at least one single event selected based on at least one trainer character further selected through the user interface, have been combined, and may perform the single event between the turns of a promotion scenario. More specifically, a list of single events may be pre-defined for a plurality of teams present in a sports game, respectively. In this case, when a player character is selected by a user, a list of single events (i.e., the first event list) of a team to which the selected player character belongs may be selected. Furthermore, when trainer characters who will participate in the promotion scenario are selected by the user or a system (e.g., server), a list of single events (i.e., the second event list) pre-configured for the respective trainer characters may be selected. In this case, the final list of single events for the promotion of the selected player character may be generated by combining the first event list and the second event list. In this case, one single event may be selected in the final list between the turns of the promotion scenario based on a probability weight value and generated. The single events of the final list may be filtered based on criteria, such as the range (MinTurn, MaxTurn) of turns that may be generated, a preceding event (PreFsmIndex), at least likeability (LikePoint), whether an event is repeated (RepeatFlag), and a relationship degree (Relationship).

Table 2 illustrates an example of a data configuration in the first event list.

TABLE 2

| EventId | FsmId | EventWeight | ScenarioId | MinTurn | MaxTurn | PreFsmId | LikePoint | RepeatFlag |
|---------|-------|-------------|------------|---------|---------|----------|-----------|------------|
| 600101  | 700101 | 1000       | 800101     | 1       | 7       | −1       | −1        | 0          |
| 600102  | 700102 | 1000       | 800101     | 1       | 7       | −1       | −1        | 0          |
| 600103  | 700103 | 1000       | 800101     | 1       | 7       | −1       | −1        | 0          |
| 600104  | 700104 | 1000       | 800101     | 1       | 7       | −1       | −1        | 0          |
| 600105  | 700105 | 1000       | 800101     | 1       | 7       | −1       | −1        | 0          |
| 600106  | 700106 | 1000       | 800101     | 1       | 7       | −1       | −1        | 0          |
| 600107  | 700107 | 1000       | 800101     | 1       | 7       | −1       | −1        | 0          |
| 600108  | 700108 | 1000       | 800101     | 1       | 7       | −1       | −1        | 0          |

In Table 2, "EventId" may indicate the identifier of an event. "FsmId" may indicate the identifier of a separate external data table including the contents of the corresponding event so that the identifier is matched with "EventId." "EventWeight" may indicate a weight assigned to each event. "ScenarioId" may indicate the identifier of a promotion scenario configured in the team of a selected player character. "MinTurn" and "MaxTurn" may indicate a minimum turn and maximum turn by which the corresponding event may be generated. "PreFsmId" may indicate the identifier of an event generated prior to the corresponding event. "LikePoint" may indicate a minimum value of a likeability value necessary between a player character and a trainer character in order to generate the corresponding event. "RepeatFlag" may indicate whether the corresponding event is repeatedly generated.

For example, when an event "EventId" 600101 is generated, information (or progress information) related to the actual progress of the event, such as that which character appears in a screen and speaks his or her lines, and directing is performed in which order, is necessary. In this case, such progress information may be written in a separate data table. Corresponding data may be used in an identifier reference form through "FsmId."

Table 3 illustrates an example of a data configuration in the second event list.

TABLE 3

| EventId | FsmId | EventWeight | TrainerId | MinTurn | MaxTurn | PreFsmId | LikePoint | RepeatFlag |
|---------|-------|-------------|-----------|---------|---------|----------|-----------|------------|
| 300101 | 400101 | 1000 | 500101 | 1 | 7 | −1 | 10 | 1 |
| 300102 | 400102 | 1000 | 500101 | 1 | 7 | 300101 | 10 | 1 |
| 300103 | 400103 | 1000 | 500101 | 1 | 7 | 300101 | 10 | 1 |
| 300104 | 400104 | 1000 | 500101 | 1 | 7 | 300101 | 10 | 1 |
| 300105 | 400105 | 1000 | 500101 | 1 | 7 | 300102 | 10 | 1 |
| 300106 | 400106 | 1000 | 500101 | 1 | 7 | 300102 | 10 | 1 |
| 300107 | 400107 | 1000 | 500101 | 1 | 7 | 300102 | 10 | 1 |
| 300108 | 400108 | 1000 | 500101 | 1 | 7 | 300103 | 10 | 1 |

In Table 3, "EventId" may indicate the identifier of an event. "FsmId" may indicate the identifier of a separate external data table including the contents of the corresponding event so that the identifier is matched with "EventId." "EventWeight" may indicate a weight assigned to each event. "TrainerId" may indicate the identifier of a trainer character associated with the corresponding event. "MinTurn" and "MaxTurn" may indicate a minimum turn and maximum turn by which the corresponding event may be generated. "PreFsmId" may indicate the identifier of an event generated prior to the corresponding event. "LikePoint" may indicate a minimum value of a likeability value necessary between a player character and a trainer character in order to generate the corresponding event. "RepeatFlag" may indicate whether the corresponding event is repeatedly generated.

Furthermore, when two or more trainer characters are selected through the user interface at step 330, the computer apparatus 200 determines whether a combo event associated with given two or more trainer characters included in a third event list including combo events selected based on a combination of the selected two or more trainer characters is generated at timing at which a progressed single event is terminated, and may determine that the combo event is generated. The computer apparatus 200 may select a given combo event in the third event list in response to the generation of the combo event, and may perform the selected combo event. More specifically, when two or more trainer characters who will participate in a promotion scenario are selected by a user or system (e.g., server), a list combo events (i.e., the third event list) based on a combination of the selected trainer characters may be selected. Whether to generate such a combo event may be determined at timing when a single event is terminated.

Table 4 illustrates an example of a data configuration in the third event list.

TABLE 4

| Id | StoryId | Trainer1Id | Trainer2Id | Trainer3Id | Trainer4Id |
|----|---------|------------|------------|------------|------------|
| 1 | 10001 | 500101 | 500201 | 0 | 0 |
| 2 | 10002 | 500102 | 500202 | 0 | 0 |
| 3 | 10003 | 500103 | 500203 | 0 | 0 |
| 4 | 10004 | 500104 | 500204 | 0 | 0 |
| 5 | 10005 | 500105 | 500205 | 0 | 0 |
| 6 | 10006 | 500106 | 500206 | 0 | 0 |

TABLE 4-continued

| Id | StoryId | Trainer1Id | Trainer2Id | Trainer3Id | Trainer4Id |
|----|---------|------------|------------|------------|------------|
| 7 | 10007 | 500107 | 500207 | 0 | 0 |
| 8 | 10008 | 500108 | 500208 | 0 | 0 |

In Table 4, "Id" may indicate the identifier of a combo event. "StoryId" may indicate the identifier of a separate external data table including the contents of the combo event so that the identifier is matched with "Id." For example, a combo event having "Id" 1 may be generated in the state in which trainer characters 500101 and 500201 have been retained in a trainer deck. When the combo event having "Id" 1 is generated, information (or progress information) related to the actual progress of the combo event, such as that which character appears in a screen and speaks his or her lines, and directing is performed in which order, is necessary. In this case, such progress information may be written in a separate data table. Corresponding data may be used in an identifier reference form through "StoryId." "Trainer1Id", "Trainer2Id", "Trainer3Id", and "Trainer4Id" may mean a combination of trainer characters. For example, a combo event having the identifier "1" may be selected by a combination of a trainer character identified by the identifier "500101" and a trainer character identified by the identifier "500201."

Figure 9:
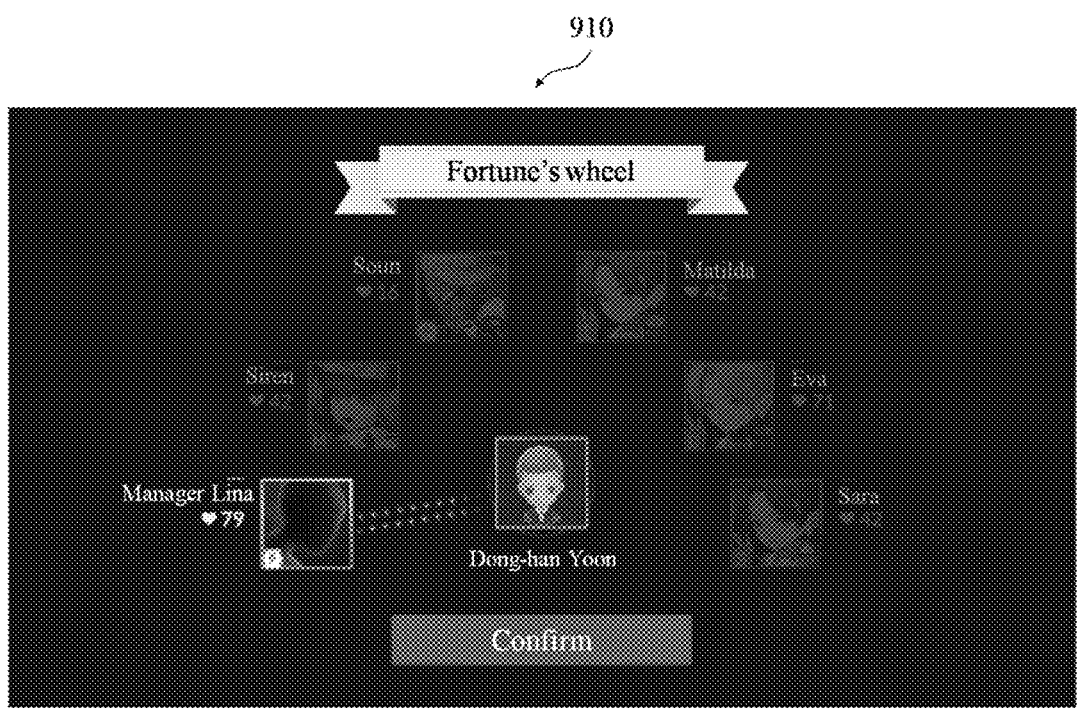
FIG. 9 is a diagram illustrating an example of an implementation of a connection system according to an exemplary embodiment of the present invention.

FIG. 9 is a diagram illustrating an example of an implementation of a connection system according to an exemplary embodiment of the present invention. In FIG. 9, a screen 901 illustrates an example of a likeability value between a player character selected by a user and each of trainer characters selected by a user or system. For example, the likeability value of a trainer character 1 for a player character 1 may be set as a value of "79." The computer apparatus 200 may establish a connection relationship between a given trainer character and a player character based on a likeability value set between each of trainer characters and the player character. For example, the computer apparatus 200 may define a special relationship between one of trainer characters whose likeability value is a preset value (e.g., 50) or more and a player character, that is, a promotion target, by matching the one trainer character and the player character. As a more detailed example, when a relationship is defined, if characters have the same sex template value, a relationship "friendship" may be set. If the characters have different sex template values, a relationship "lover" may be set.

As described above, in the state in which a specific turn or more has been performed and a trainer character whose likeability value for a player character is a preset value or more is present, a connection relationship between the player character and the trainer character may be established between turns in which an event is not performed. In this case, the trainer character that establishes the connection relationship with the player character may be selected based on a weight probability based on a current likeability value.

TABLE 5

| Item | Trainer character 1 | Trainer character 2 | Trainer character 3 | Trainer character 4 |
|---|---|---|---|---|
| Likeability value | 50 | 70 | 65 | 20 |
| Probability | 50/205 | 70/205 | 65/205 | 20/205 |

In Table 5, "205" may be the sum (50+70+65+20) of likeability values of all trainer characters. In other words, a trainer character who will have a connection relationship with a player character may be determined based on a weight probability based on a likeability value between the player character and the trainer character. As the likeability value is higher, the probability that a connection relationship will be established may be increased.

The connection relationship may be maintained until a promotion scenario is stopped or completed. A connection relationship that has been established once may not be changed during the progress of a promotion scenario. Such a connection relationship may generate a special effect in a training process and/or results. For example, a training effect may be applied to all pieces of training in common regardless of whether a trainer character having a connection relationship established participates in the training. A training effect that is applied may be increased according to the growth of a trainer character having a connection relationship established. The training effect may include an effect applied to a training process, such as that the exhaustion of physical strength necessary for training is decreased or a success rate is increased, and may include an effect applied to training results, such as that an increment of a status value of a player character is increased according to training.

The likeability value described in Table 5 may be increased if a trainer character participates in the training of a player character, if a player character completes an event associated with a specific trainer character and/or if a corresponding trainer character grows.

As described above, in a sports game, the three major growth systems for training, an event and a connection provided through the second virtual space different from the first virtual space for a game interact with each other, and can provide various types of content along with the promotion of a player character. For example, a likeability value between a player character and a trainer character may be adjusted based on at least one of training and an event generated according to the progress of a promotion scenario. A connection relationship may be established between a player character and a given trainer character based on such a likeability value. A boosting effect for increasing a training effect may be applied to the training of the player character based on the established connection relationship. In other words, the training and the event enable the connection relationship to be established by adjusting the likeability value between the player character and the trainer character. Such a connection relationship is incorporated into training again, thus increasing the training effect. Accordingly, more various types of content related to the promotion of a player character can be provided without being limited to simple training for a player character.

As described above, according to embodiments of the present invention, in a sports game, a player character can be promoted through a second virtual space in which a promotion scenario is performed separately from a first virtual space related to the progress of a game. Furthermore, various promotion scenarios for one player character can be provided according to a promotion scenario that belongs to multiple promotion scenarios configured for each team, each player character and/or each trainer character and that is determined or combined based on a selected team, selected player character and/or selected trainer character. Furthermore, users can be provided with more various experiences and interests by providing the function capable of establishing a relationship between various events or characters in addition to the promotion of a character through the second virtual space and providing the opportunity to improve a status based on a relationship between characters.

The generation of an event, the generation of an event list, or the deployment of a trainer character upon training may be performed by the computer apparatus 200 under the control of a computer program (e.g., sports game app) installed and driven in the computer apparatus 200 described with reference to FIG. 3, but may be performed by a server from which the computer apparatus 200 receives services for a sports game over the network 170 through a computer program. For example, the server may manage the parameters described in Table 1 to Table 5, and may provide promotion services for a player character as at least some of services for a sports game using such parameters.

The aforementioned system or apparatus may be implemented in the form of a hardware element or a combination of a hardware element and a software element. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

In a sports game, a player character can be promoted through a second virtual space in which a promotion scenario is performed separately from a first virtual space related to the progress of the game.

Various promotion scenarios can be provided to one player character according to a promotion scenario determined or combined based on a selected team, a selected player character and/or a selected trainer character, among multiple promotion scenarios configured for each team, each player character and/or each trainer character.

A function capable of establishing a relationship between various events or characters in addition to the promotion of a character can be provided through the second virtual space, and an opportunity to improve a status based on the relationship between the characters can be provided. Accordingly, users can be provided with more various experiences and interests.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A non-transitory processor-readable medium having instructions stored thereon, which when executed by one or more processors, cause the one or more processors to implement a player character promotion method, comprising:
   processing a progress of a sports game instance in which at least one player character controlled in response to a user's input participates through a first virtual space configured for a progress of a sports game;
   providing a user interface for promoting a promotion mode for a given player character between sports game instances; and
   performing a promotion scenario for a selected player character through a second virtual space different from the first virtual space for the progress of the sports game instance when the promotion mode for the selected player character is activated through the user interface;
   wherein the promotion scenario is performed using a turn method;
   wherein performing the promotion scenario comprises:
      selecting a single event associated with a given trainer character in a combination list in which a first event list comprising at least one single event selected based on a team to which a player character selected through the user interface belongs and a second event list comprising at least one single event selected based on at least one trainer character further selected through the user interface have been combined, and
      performing the selected single event between turns of the promotion scenario, and
   wherein a likeability value between the given trainer character and the player character is adjusted according to the progress of the single event.

2. The non-transitory processor-readable medium of claim 1, wherein:
   a promotion scenario is configured in each of a plurality of teams included in the sports game, and
   performing the promotion scenario comprises performing a promotion scenario pre-configured for a team to which a player character selected through the user interface belongs.

3. The non-transitory processor-readable medium of claim 1, wherein:
   performing the promotion scenario comprises:
      determining whether a combo event associated with given two or more trainer characters included in a third event list comprising combo events selected based on a combination of two or more trainer characters is generated at timing at which the progressed single event is terminated when the two or more trainer characters are selected through the user interface,
      selecting a given combo event in the third event list in response to the determination of the combo event generated, and
      performing the selected combo event, and
   a likeability value between each of the given two or more trainer characters and the player character is adjusted according to the progress of the combo event.

4. The non-transitory processor-readable medium of claim 1, wherein:
   performing the promotion scenario comprises performing training of the player character in which a trainer character selected among at least one trainer character further selected through the user interface participates, and
   a status of the player character is adjusted based on a result of the progress of the training into which a training effect according to the selected trainer character has been incorporated.

5. The non-transitory processor-readable medium of claim 4, wherein the trainer character scheduled to participate in the training of the player character is selected based on a probability for each status item, belonging to probabilities for respective status items configured in each of the further selected at least one trainer character and corresponding to a status item by which the player character is to be trained through the training.

6. The non-transitory processor-readable medium of claim 5, wherein the trainer character scheduled to participate in the training of the player character is selected further based on a likeability value set between the player character and each of the further selected at least one trainer character.

7. The non-transitory processor-readable medium of claim 4, wherein as the training proceeds, a likeability value between the selected trainer character and the player character is further adjusted.

8. The non-transitory processor-readable medium of claim 1, wherein:
  performing the promotion scenario comprises establishing a connection relationship between a given trainer character and the player character based on a likeability value set between the player character and each of at least one trainer character further selected through the user interface, and
  a boosting effect for increasing a training effect is applied to training of the player character based on the established connection relationship.

9. A player character promotion method performed by a computer apparatus comprising at least one processor, the method comprising:
  processing, by the at least one processor, a progress of a sports game instance in which at least one player character controlled in response to a user's input participates through a first virtual space configured for a progress of a sports game;
  providing, by the at least one processor, a user interface for promoting a promotion mode for a given player character between sports game instances; and
  performing, by the at least one processor, a promotion scenario for a selected player character through a second virtual space different from the first virtual space for the progress of the sports game instance when the promotion mode for the selected player character is activated through the user interface;
  wherein a likeability value between the player character and at least one trainer character further selected through the user interface is adjusted based on at least one of training and an event generated according to the progress of the promotion scenario,
  wherein a connection relationship is established between the player character and a given trainer character based on the likeability value, and
  wherein a boosting effect for increasing a training effect is applied to training of the player character based on the established connection relationship.

10. A non-transitory processor-readable medium having instructions stored thereon, which when executed by one or more processors, cause the one or more processors to implement a player character promotion method, comprising:
  processing a progress of a sports game instance in which at least one player character controlled in response to a user's input participates through a first virtual space configured for a progress of a sports game;
  providing a user interface for promoting a promotion mode for a given player character between sports game instances; and
  performing a promotion scenario for a selected player character through a second virtual space different from the first virtual space for the progress of the sports game instance when the promotion mode for the selected player character is activated through the user interface;
  wherein performing the promotion scenario comprises performing training of the player character in which a trainer character selected among at least one trainer character further selected through the user interface participates;
  wherein a status of the player character is adjusted based on a result of the progress of the training into which a training effect according to the selected trainer character has been incorporated; and
  wherein the trainer character scheduled to participate in the training of the player character is selected based on a probability for each status item, belonging to probabilities for respective status items configured in each of the further selected at least one trainer character and corresponding to a status item by which the player character is to be trained through the training.

11. The non-transitory processor-readable medium of claim 10, wherein the trainer character scheduled to participate in the training of the player character is selected further based on a likeability value set between the player character and each of the further selected at least one trainer character.

12. The non-transitory processor-readable medium of claim 10, wherein:
  a promotion scenario is configured in each of a plurality of teams included in the sports game, and
  performing the promotion scenario comprises performing a promotion scenario pre-configured for a team to which a player character selected through the user interface belongs.

13. A non-transitory processor-readable medium having instructions stored thereon, which when executed by one or more processors, cause the one or more processors to implement a player character promotion method, comprising:
  processing a progress of a sports game instance in which at least one player character controlled in response to a user's input participates through a first virtual space configured for a progress of a sports game;
  providing a user interface for promoting a promotion mode for a given player character between sports game instances; and
  performing a promotion scenario for a selected player character through a second virtual space different from the first virtual space for the progress of the sports game instance when the promotion mode for the selected player character is activated through the user interface;
  wherein performing the promotion scenario comprises performing training of the player character in which a trainer character selected among at least one trainer character further selected through the user interface participates;
  wherein a status of the player character is adjusted based on a result of the progress of the training into which a training effect according to the selected trainer character has been incorporated; and
  wherein as the training proceeds, a likeability value between the selected trainer character and the player character is further adjusted.

14. The non-transitory processor-readable medium of claim 13, wherein:
  a promotion scenario is configured in each of a plurality of teams included in the sports game, and
  performing the promotion scenario comprises performing a promotion scenario pre-configured for a team to which a player character selected through the user interface belongs.

15. A non-transitory processor-readable medium having instructions stored thereon, which when executed by one or more processors, cause the one or more processors to implement a player character promotion method, comprising:

processing a progress of a sports game instance in which at least one player character controlled in response to a user's input participates through a first virtual space configured for a progress of a sports game;

providing a user interface for promoting a promotion mode for a given player character between sports game instances; and performing a promotion scenario for a selected player character through a second virtual space different from the first virtual space for the progress of the sports game instance when the promotion mode for the selected player character is activated through the user interface;

wherein performing the promotion scenario comprises establishing a connection relationship between a given trainer character and the player character based on a likeability value set between the player character and each of at least one trainer character further selected through the user interface; and wherein a boosting effect for increasing a training effect is applied to training of the player character based on the established connection relationship.

16. The non-transitory processor-readable medium of claim 15, wherein:

a promotion scenario is configured in each of a plurality of teams included in the sports game, and performing the promotion scenario comprises performing a promotion scenario pre-configured for a team to which a player character selected through the user interface belongs.

\* \* \* \* \*